(12) United States Patent
Kuhns

(10) Patent No.: US 7,275,904 B2
(45) Date of Patent: Oct. 2, 2007

(54) BALE ACCUMULATOR

(76) Inventor: Kenneth Kuhns, 4210 Kinnsman Rd., North Bloomfield, OH (US) 44450

( * ) Notice: Subject to any disclaimer, the term of this patent is extended or adjusted under 35 U.S.C. 154(b) by 49 days.

(21) Appl. No.: 10/429,562

(22) Filed: May 5, 2003

(65) Prior Publication Data

US 2004/0223833 A1    Nov. 11, 2004

(51) Int. Cl.
*A01D 90/08* (2006.01)
*A01D 85/00* (2006.01)
*B65G 27/00* (2006.01)
*B65G 57/00* (2006.01)

(52) U.S. Cl. .................... 414/111; 414/24.5; 414/25; 414/789.7

(58) Field of Classification Search ............ 414/24.5, 414/24.6, 111, 467, 537, 789.7, 25
See application file for complete search history.

(56) References Cited

U.S. PATENT DOCUMENTS

| | | | |
|---|---|---|---|
| 2,316,435 A | | 4/1943 | James |
| 3,229,834 A | * | 1/1966 | Dodd et al. ................ 414/537 |
| 3,302,807 A | * | 2/1967 | Blair ....................... 414/789.7 |
| 3,308,971 A | * | 3/1967 | Roland et al. ............ 414/789.7 |
| 3,515,290 A | * | 6/1970 | Hill et al. ................. 414/789.1 |
| 3,924,757 A | | 12/1975 | Meyer |
| 4,006,830 A | * | 2/1977 | Knaggs .................... 414/791.5 |
| 4,051,964 A | | 10/1977 | Meijer |
| 4,053,064 A | | 10/1977 | Stewart |
| 4,909,698 A | * | 3/1990 | Martin ...................... 414/501 |
| 4,961,679 A | | 10/1990 | Van Eecke et al. ......... 414/111 |
| 5,501,562 A | * | 3/1996 | Zimmerman ............... 414/111 |
| 5,829,238 A | | 11/1998 | Branson ..................... 56/475 |
| 6,070,400 A | * | 6/2000 | Peeters et al. ............... 53/588 |
| 6,364,591 B1 | * | 4/2002 | Stevenson ................... 414/25 |
| 6,478,523 B1 | * | 11/2002 | Meijer ....................... 414/111 |
| 2002/0187021 A1 | * | 12/2002 | Drost ........................ 414/111 |
| 2004/0223833 A1 | * | 11/2004 | Kuhns ....................... 414/111 |

OTHER PUBLICATIONS

Innovations By Phiber; publication date unknown, but prior to Jul. 26, 2002.
Circle C Equipment, LLC; publication date unknown, but prior to Jul. 26, 2002.
Steffen Systems, Inc., publication entitled *Innovative Hay Handling Solutions For Today's Hay Producers*; publication date unknown, but prior to Jul. 26, 2002.
Hoelscher, publication entitled *Systems for stacking, loading, feeding, or shipping square bales*; publication date unknown, but prior to Jul. 26, 2002.

* cited by examiner

*Primary Examiner*—Gene O. Crawford
*Assistant Examiner*—Evan Langdon
(74) *Attorney, Agent, or Firm*—Tarolli, Sundheim Covell & Tummino LLP

(57) ABSTRACT

A bale accumulator is utilized to deposit bales in groups in a field. The bale accumulator includes a chute along which bales move to an upper end portion of an accumulator ramp assembly. The accumulator ramp assembly slopes downward away from the chute. The chute may rotate the bales through a quarter turn. The accumulator ramp assembly includes a plurality of guides which form compartments in which bales are accumulated. A plurality of diverter gates are operable to direct bales into each of the compartments as the bales slide along an upper side of the ramp. An exit gate is operable to an open condition to enable bales accumulated in the compartments to move along an upper side of the exit gate and be deposited in a group in the field.

35 Claims, 9 Drawing Sheets

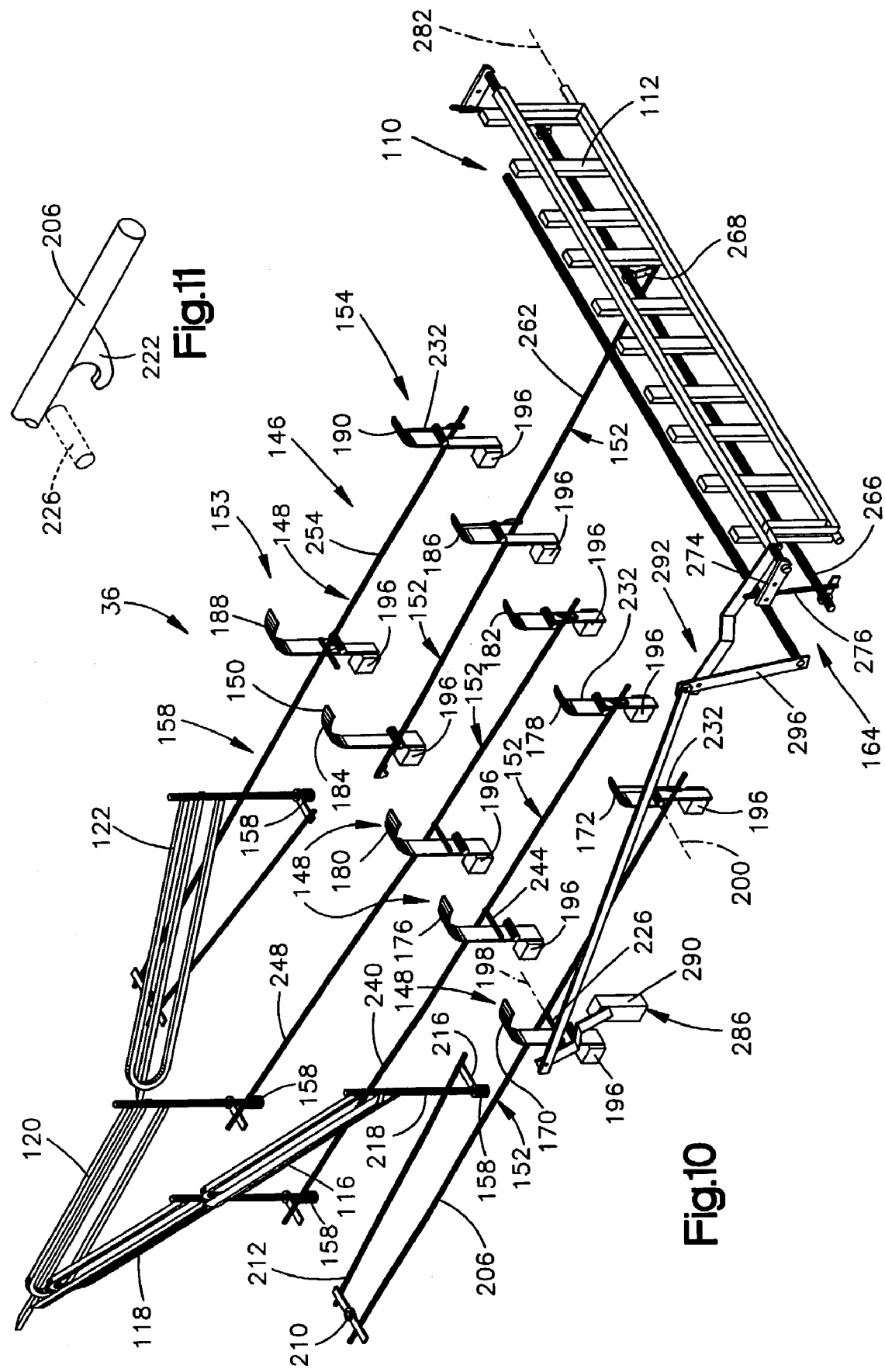

BALE ACCUMULATOR

BACKGROUND OF THE INVENTION

The present invention relates to a new and improved apparatus for use in depositing bales in groups in a field.

After a crop stock has been cut, the crop stock is collected and formed into bales to facilitate subsequent handling. The crop stock may be hay, alfalfa, oats, straw, soy beans or other crops. It has previously been suggested that the bales of the crop stock may be collected in groups in a field to facilitate subsequent pick up and handling of the bales. Known devices for collecting groups of bales in a field are disclosed in U.S. Pat. Nos. 3,924,757; 4,051,964 and 4,053,064.

SUMMARY OF THE INVENTION

An improved apparatus is provided to deposit bales in groups in a field. This apparatus may include a chute having a lower end portion through which bales move into the chute and an upper end portion through which bales leave the chute. The bales may move from the chute onto a ramp having an upper side which slopes downward in a direction away from the chute.

A plurality of guides may be provided adjacent to the upper side of the ramp to form compartments in which bales are accumulated. Diverter gates may be provided at the upper end portion of the ramp to direct the bales into each of the compartments in turn. An exit gate is disposed adjacent to the lower end portion of the ramp.

The exit gate is operable between a closed condition blocking movement of bales from the compartments and an open condition in which bales accumulated in the compartments can move off of the ramp onto the field. When the exit gate is in the open condition, the exit gate may form an extension of the ramp to enable bales to move along an upper side of the exit gate onto the field.

When the bales are deposited in the field, they are advantageously deposited with cut stems of the crop stock in an upright orientation to facilitate drying of the crop stock. To enable the bales to be positioned on the field with the cut stems in an upright orientation, the chute may be effective to rotate the bales through a quarter turn.

The present invention relates to a bale accumulator having a plurality of different features. These features may be utilized in combination with each other in the manner disclosed in herein. Alternatively, the features may be used separately and/or in combination with features of known devices.

BRIEF DESCRIPTION OF THE DRAWINGS

The foregoing and other objects and features of the present invention will become more apparent upon a consideration of the following description taken in connection with the accompanying drawings wherein:

FIG. 10 is a simplified schematic illustration depicting the relationship of a plurality of operator assemblies to the diverter and exit gates;

FIG. 11 is an enlarged fragmentary illustration of a hook connected with a rod in a force transmitting assembly which forms part of one of the operator assemblies of FIG. 10.

DESCRIPTION OF A SPECIFIC PREFERRED EMBODIMENTS OF THE INVENTION

General Description

Figure 1:
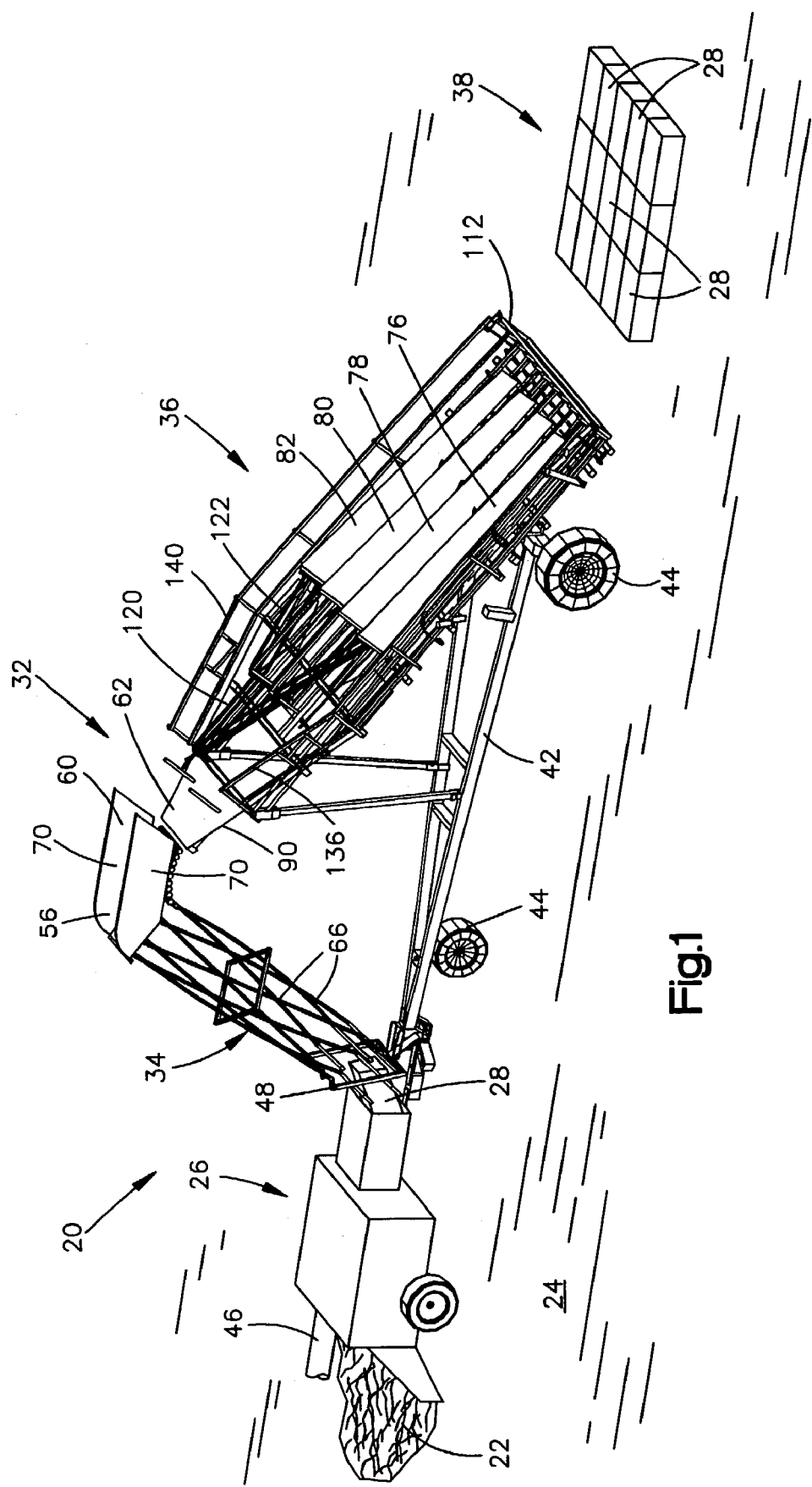
FIG. 1 is a schematic illustration depicting an apparatus which is used to form bales of a cut crop stock, accumulate the bales, and deposit the bales in a group in a field.

An apparatus 20 (FIG. 1) is used in the harvesting of a crop stock 22 in a field 24. The crop stock 22 may be hay, alfalfa, oats, straw, or soybeans. Of course, an apparatus having a construction similar to the apparatus 20 may be utilized in the harvesting of other crops if desired. Although the apparatus 20 may be utilized in the harvesting of many different types of crop stocks, it is believed that the apparatus 20 will be particularly advantageous in the harvesting of hay.

The apparatus 20 includes a known baler 26 which is pulled by a tractor (not shown). The baler 26 is utilized to form the crop stock 22 into rectangular bales 28. In the specific instance illustrated schematically in FIG. 1, the crop stock 22 is hay and the baler 26 is utilized to form bales 28 of hay.

The rectangular bales 28 of hay may have any desired dimension. With one specific embodiment of the invention, the bales 28 of hay were 14 inches by 16 inches in cross section and had a length of between 38 and 50 inches. It should be understood that the foregoing specific dimensions for the bales 28 of hay have been set forth herein merely for purposes of clarity of description and it is contemplated that the apparatus 20 may be utilized to form bales of many different dimensions.

The bales 28 of hay are conducted from the hay baler 26 (FIG. 1) to a bale accumulator 32 which is constructed and operated in accordance with the present invention. The bale accumulator 32 includes a chute 34 through which the bales move to an accumulator ramp assembly 36. When a sufficient number of bales 28 have been collected on the accumulator ramp assembly 36 to form a group 38 containing a desired number of bales, the bales are discharged from the accumulator ramp assembly 36 onto the field 24.

In the specific instance illustrated in FIG. 1, the group 38 of bales 28 is five bales wide and three bales long. It should be understood that the group 38 of bales could be formed differently and could contain a greater or lesser number of bales.

Figure 2:
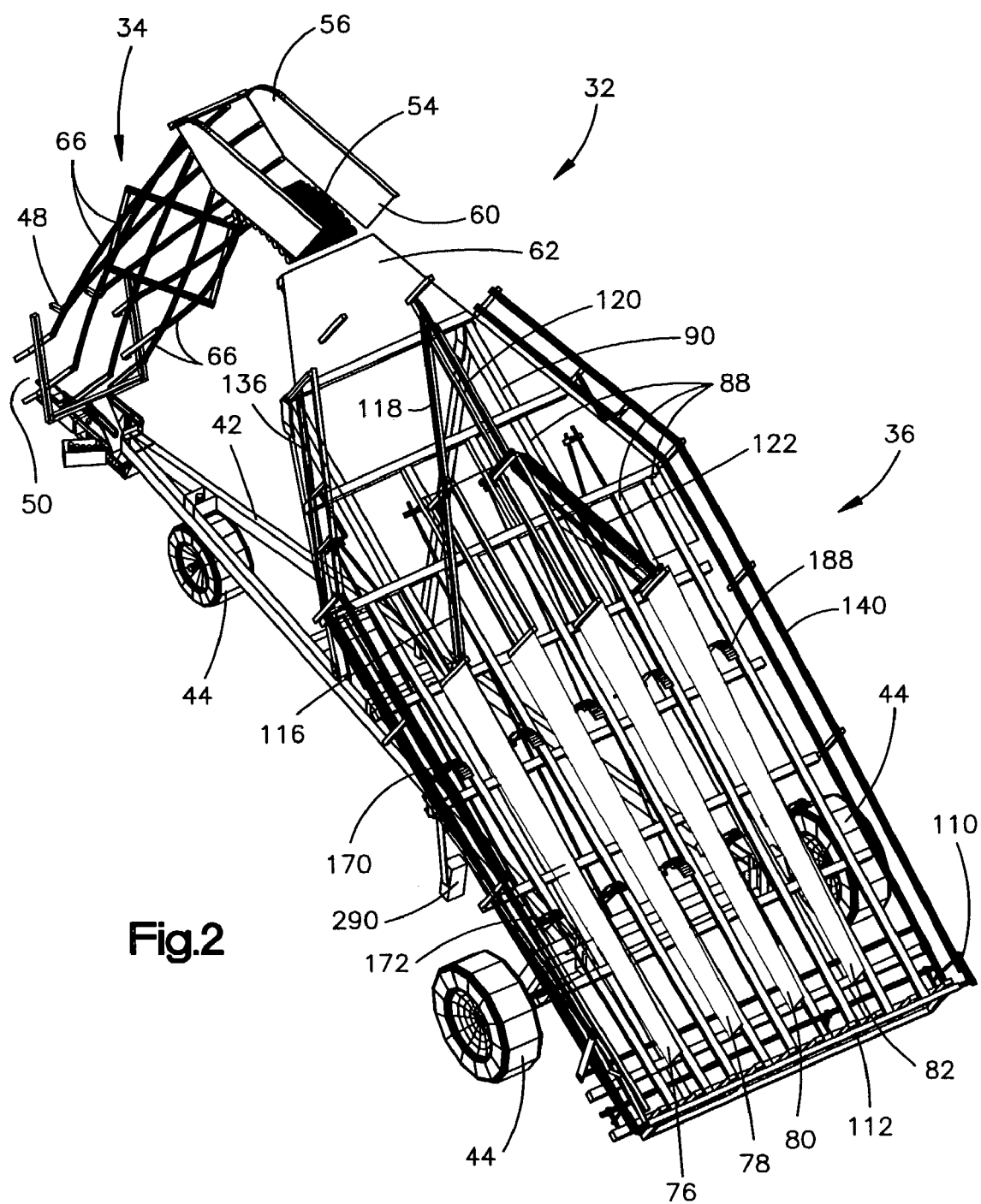
FIG. 2 is a schematic rear pictorial illustration of a bale accumulator constructed in accordance with the present invention and used in the apparatus of FIG. 1.
Figure 3:
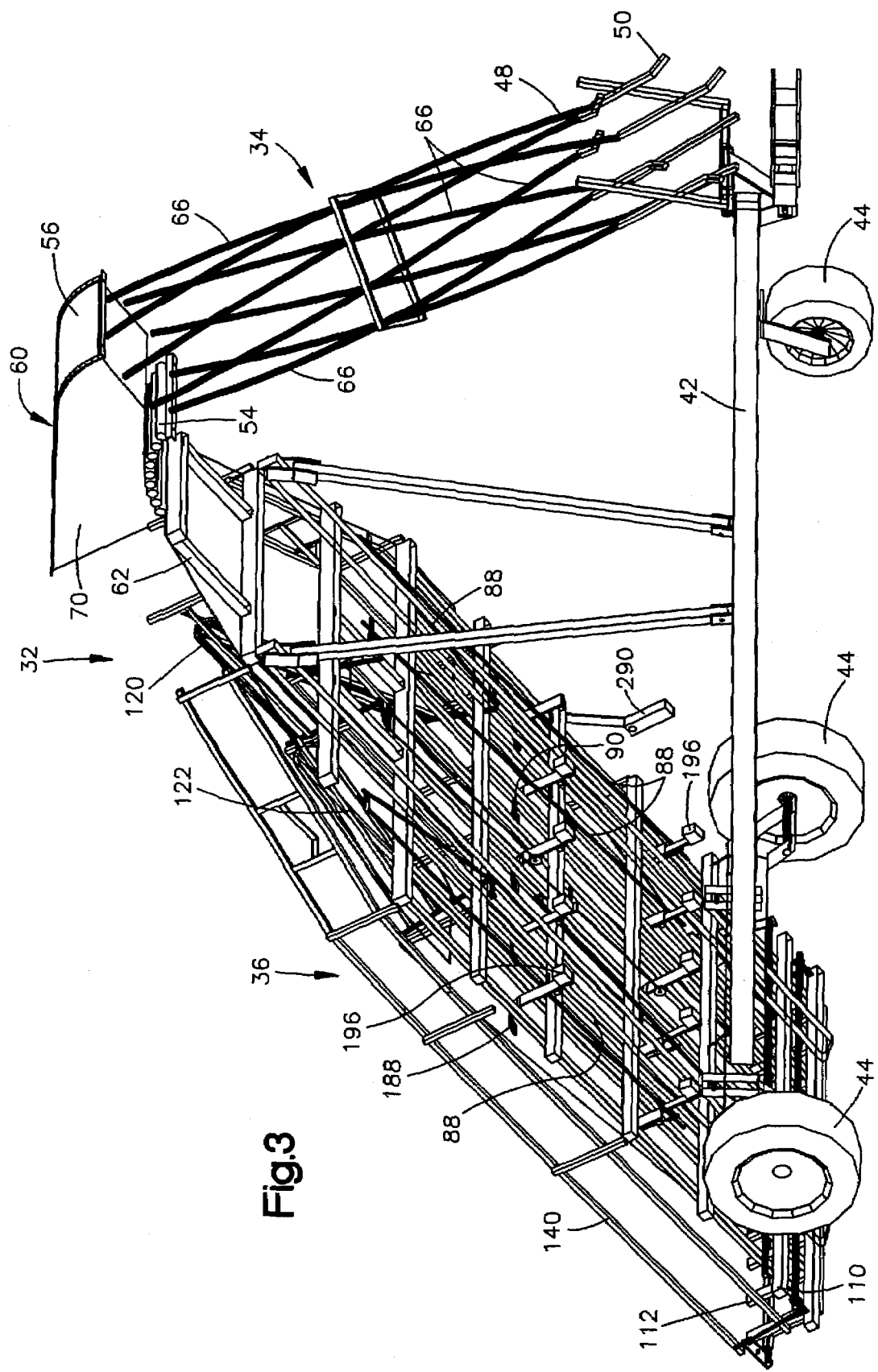
FIG. 3 is a schematic front pictorial illustration of the bale accumulator of FIG. 2.

The chute 34 and the accumulator ramp assembly 36 are disposed on a base 42 which is supported by wheels 44 (FIGS. 1, 2 and 3). The base 42 is supported by three wheels. However, it should be understood that a greater number of wheels may be provided if desired. The base 42 is connected with and is pulled by the baler 26 (FIG. 1). The baler 26 is in turn connected with and pulled by a tractor (not shown). A drive shaft 46 extends from the tractor to the baler 26 to drive the baler to form the loose hay 22 into bales 28 in a known manner.

Chute

The bale accumulator 32 (FIGS. 1-3) includes the chute 34 which receives bales 28 from the baler 26 (FIG. 1). The chute 34 has a lower end portion 48 with a rectangular entrance 50 through which the bales 28 move into the chute. The baler 26 is effective to push a continuous series of bales 28 through the entrance 50 (FIGS. 2 and 3) and into the chute 34. The bales 28 sequentially move up the chute 34 onto rollers 54 at an upper end portion 56 of the chute 34. The bales 28 sequentially move from the rollers 54 through an exit 60 from the chute 34 onto an upper end portion 62 of the accumulator ramp assembly 36.

As the bales 28 move up the chute 34, a leading end of one bale applies force against a trailing end of the next preceding bale. The bales 28 are disposed in end-to-end engagement with each other as they move up the chute 34. The baler 26 applies force against a bale 28 entering the chute 34 to shove a series of bales up the chute.

As the bales 28 sequentially move up the chute 34 toward the upper end portion 62 of the accumulator ramp assembly 36, the bales are rotated for a quarter turn. Thus, each bale 28 is rotated through ninety degrees about an axis which extends parallel to a longitudinal central axis of the chute 34 and is coincident with a central axis of the bale. By rotating the bale through a quarter of a turn as the bale moves up the chute 34, the orientation of stems of cut hay in the bale 28 is changed.

When a bale 28 moves from the baler 26 (FIG. 1), the stems of the hay have longitudinal axes which extend generally parallel to the field 24. If the bale 28 of hay is positioned in the group 38 (FIG. 1) of bales with the stems extending horizontally, that is generally parallel to the field 24, the ends of the stems on bales in the central portion of the group 38 would be blocked by adjacent bales. However, by rotating each bale 28 through a quarter of a turn, that is ninety degrees, about the central axis of the bale, the stems are moved to an upright orientation.

When the bales 26 are placed in the group 38 with the stems in an upright orientation, the cut ends of the stems are exposed to the atmosphere above the group 38 of bales. Even though a bale 28 is disposed in a central portion of the group 38 of bales, the cut ends of hay stems are exposed to the atmosphere. This enables moisture to readily move from the hay to the atmosphere with a resulting drying of the hay in the bales 28.

To sequentially rotate the bales 28 about their central axes, the chute 34 includes a plurality of longitudinally extending members 66 (FIGS. 1-3). The members 66 are bent so that the upper ends of the members are offset from the lower ends of the members. The upper ends of the members 66 are offset from the lower ends of the members by ninety degrees about a longitudinal central axis of the chute 34. This results in the members 66 imparting a twisting force to the outer sides of the bales.

The members 66 have longitudinally extending side surfaces which engage the sides of the bales 28. The longitudinally extending side surfaces of the members 66 which engage the sides of the bales 28 are disposed in a rectangular array having a cross sectional configuration corresponding to the cross sectional configuration of a bale 28. These surfaces cooperate with each of the bales 28 to rotate the bale about the longitudinal central axis of the chute 34 as the bale moves upward through the chute.

In the illustrated embodiment of the chute 34, the members 66 are spaced apart from each other so that they engage spaced apart locations on the exterior surfaces of a bale 28. This reduces resistance to movement of the bales along the chute 34. However, if desired, the members 66 may be replaced by panels which engage the sides of the bales 28.

The exit 60 from the upper end portion 56 of the chute 34 includes a pair of guide plates 70 (FIG. 4) between which each of the bales 28 passes. As a bale 28 passes between the guide plates 70, the stems on the hay in the bale have upright longitudinal axes which extend generally parallel to flat major side surfaces of the guide plates. As the bales 28 move between the guide plates 70, the bales move onto the rollers 54.

The cylindrical rollers 54 are disposed in an array which slopes downward from the upper end portion of the chute 34 toward the upper end portion 62 of the accumulator ramp assembly 36. The cylindrical rollers 54 are freely rotatable about their parallel central axes. Each bale 28 in turn accelerates as it moves downward along the array of rollers 54. Therefore, a bale 28 which is disposed on the rollers 54 moves away from a next succeeding bale in the chute 34. This results in the bales 28 being disposed in a spaced apart relationship as they move onto the upper end portion 62 of the accumulator ramp assembly 36.

In the embodiment of the invention illustrated in FIGS. 1-3, the chute 34 is effective to rotate the bales 28 through a quarter of a turn about longitudinal central axes of the bales. However, if desired, the chute 34 may be constructed so that the bales 28 move up the chute without being rotated through a quarter turn. If this is done, the bales 28 may be rotated through a quarter turn either before the bales enter the chute or after the bales leave the chute. Of course, the step of rotating the bales 28 for a quarter turn may be omitted if desired.

Accumulator Ramp Assembly

The accumulator ramp assembly 36 has a plurality of parallel guide members (or panels) 76, 78, 80, and 82 (FIG. 4) which extend upward from a plurality of bars 88 (FIG. 3) which form a ramp 90. The ramp 90 and guide members 76-82 (FIG. 4) cooperate to define a plurality of parallel longitudinally extending rectangular compartments 96, 98, 100, 102, and 104 which extend along an upper side of the ramp. The length of the compartments 96-104 may vary as a function of the length of the bales 28 and the number of bales in each of the rows of bales in the group 38 (FIG. 1).

By forming the ramp 90 (FIG. 3) with a plurality of bars 88, the surface area which engages each of the bales 28 is minimized to thereby minimize friction forces between the bales and the ramp. However, the ramp 90 may be formed by a flat metal sheet which extends downward from the upper end portion 62 of the accumulator ramp assembly.

To further promote downward sliding movement of the bales along the ramp 90, the ramp slopes at an angle of thirty degrees to thirty-five degrees to the field 24. As a result of having the ramp 90 inclined at an angle of thirty to thirty-five degrees and formed by a plurality of spaced apart metal bars 88, friction forces between the bales 28 and the ramp are ineffective to prevent downward sliding movement of the bales along the upper side of the ramp under the influence of gravity. If desired, the guide members 76-82 may also be formed by a plurality of spaced apart metal bars.

The ramp 90 (FIG. 3) slopes downward from the upper end portion 62 of the ramp to a lower end portion 110 (FIGS. 2-4) of the ramp. An exit gate 112 is disposed at the lower end portion 110 of the ramp 90. The exit gate 112 blocks movement of the bales 28 from the ramp 90 when the exit gate is in the closed condition illustrated in FIGS. 2-4. When the exit gate 112 is in the open condition illustrated in FIG. 9, the exit gate is ineffective to block movement of bales 28 down the ramp.

A plurality of diverter gates 116, 118, 120, and 122 (FIG. 4) are disposed at the upper end portion 62 of the ramp 90. The diverter gates are effective to direct bales 28 into each of the compartments 96-104 in turn. In addition, the diverter gates 116-122 are effective to block movement of bales into a compartment after a predetermined number of bales have moved into the compartment. Thus, when one of the compartments 96-104 has been filled with bales, the diverter gates are effective to direct bales to a next succeeding compartment.

In order to form the group 38 of bales illustrated schematically in FIG. 1, there are five rows containing three bales each. There are five compartments 96-104 on the ramp 90. These five compartments correspond to the five rows of bales 28 in the group 38 of bales.

In order to provide three bales 28 in each row of bales, the diverter gates 116-122 are effective to direct three bales to each of the compartments 96-104 in turn. Thus, each compartment 96-104 is filled with bales when three bales have been directed to the compartments. Once one of the compartments 96-104 has been filled with three bales 28, the diverter gates 116-122 are operated to direct bales to a next succeeding compartment.

It should be understood that the group 38 of bales 28 may be formed with a greater or lesser number of rows. It should also be understood that each row of bales 28 may contain a greater or lesser number of bales. The length of a row of bales 28 and the length of the compartments 96-104 may vary. Of course, the width and height of the compartments 96-104 may vary with variations in the width and height of the bales 28.

Accumulation of Bales

The accumulator ramp assembly 36 is empty (FIG. 4) prior to the accumulation of bales 28 on the ramp 90. At this time, the diverter gates 116-122 are in their initial positions illustrated in FIGS. 4 and 5. The exit gate 12 is in a closed condition.

When the diverter gates 116-122 are in their initial positions (FIGS. 4 and 5) the diverter gates are positioned to direct movement of bales from the chute exit 60 to the first compartment 96. The diverter gate 116 blocks movement of bales into the compartment 98 (FIG. 5). The diverter gate 118 blocks movement of bales into the compartment 100.

The diverter gate 118 is also effective to block movement of bales from the chute exit 60 toward the compartments 102 and 104.

When hay 22 (FIG. 1) is to be baled, the baler 26 moves along a row of hay and picks up the hay from the field 24. Bales 28 are ejected from the baler 26 into the chute 34. As the bales 28 move through the chute exit 60, the bales are moved into a spaced apart relationship by being accelerated as they move along the rollers 54. The spaced apart bales are directed onto the upper end portion 62 of the accumulator ramp assembly 36. The bales then slide down the ramp 90 under the influence of gravity.

As the first bale 28 leaves the chute exit 60, in the manner indicated by arrow 132 in FIG. 5, the bale engages the diverter gate 118 and moves downward along the ramp 90 into engagement with the diverter gate 116. A side rail 136 cooperates with the diverter gates 116 and 118 to form a channel along which the first bale 28 moves under the influence of gravity. As this occurs, the first bale 28 moves into the compartment 96. The compartment 96 is formed between the side rail 136 and the guide member 76. The first bale to enter the compartment 96 slides down the ramp 90 into engagement with the exit gate 112.

A next succeeding or second bale 28 moves from the chute exit 60 along the diverter gates 118 and 116 (FIG. 5) and into the compartment 96. The leading end of the second bale 28 then moves into engagement with the trailing end of the first or lead bale 28. Finally, a third bale 28 moves from the chute exit 60 into the compartment 96.

Although the group 38 (FIG. 1) of bales may have either more or less than three bales in a row, in the present instance, three bales form a row in the group 38. Therefore, once three bales have been accumulated in the compartment 96, the diverter gate 116 is moved from the initial position illustrated in FIG. 5 to the operated position illustrated in FIG. 6. When the diverter gate 116 is in the operated position (FIG. 6), the diverter gate 116 blocks the entrance to the compartment 96. At this time, the entrance to the compartment 98 is open.

A next succeeding bale 28 is directed from the chute exit 60 into the compartment 98. Thus, the next succeeding bale 28 moves from the chute exit 60 into engagement with a diverter gate 118. The bale 28 then slides downward along the ramp 90 and is directed to the compartment 98 by the diverter gate 116 which has moved from its initial position to the operated position illustrated in FIG. 6. The next two bales are sequentially directed into the compartment 98 by the diverter gates 118 and 116 (FIG. 6).

Figure 5:
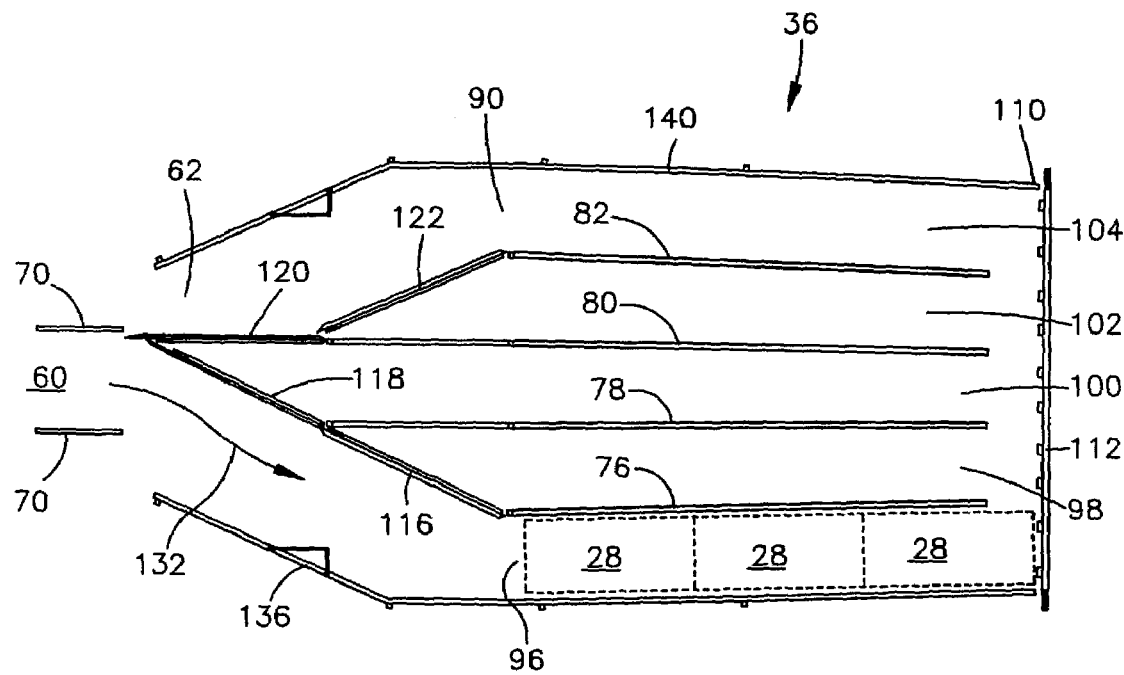
FIG. 5 is a simplified schematic plan view illustrating the manner in which diverter gates direct bales into a first compartment on the ramp of the bale accumulator of FIGS. 2 and 3.
Figure 6:
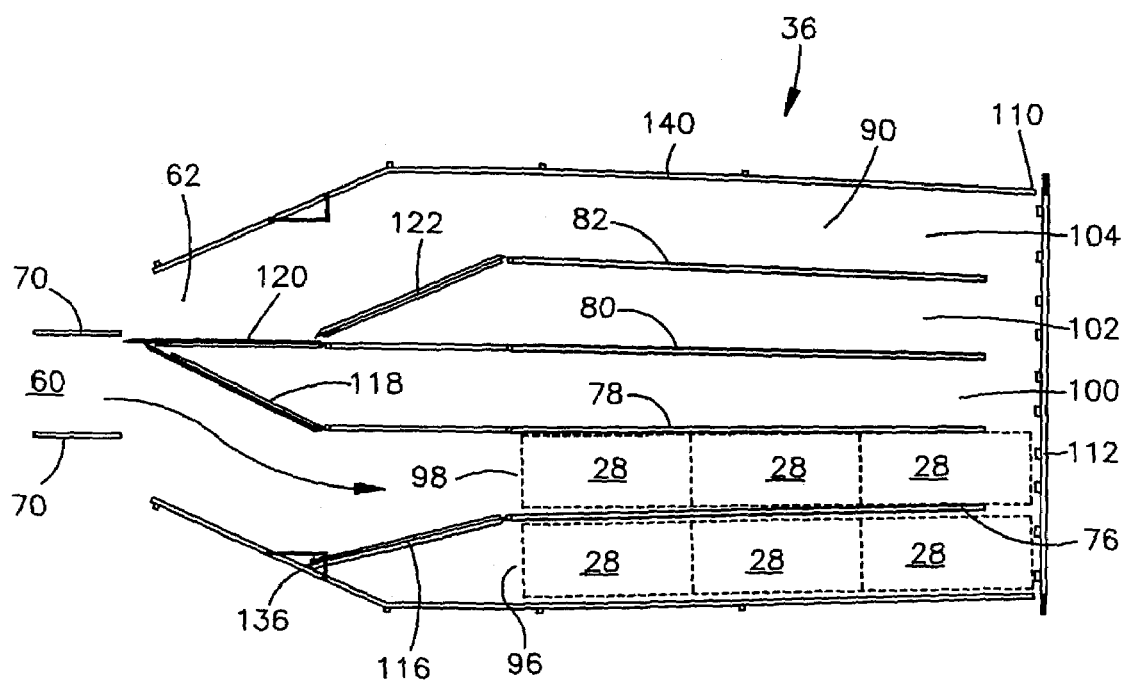
FIG. 6 is a schematic plan view, generally similar to FIG. 5, illustrating the manner in which the diverter gates direct bales into a second compartment on the ramp of the bale accumulator.
Figure 7:
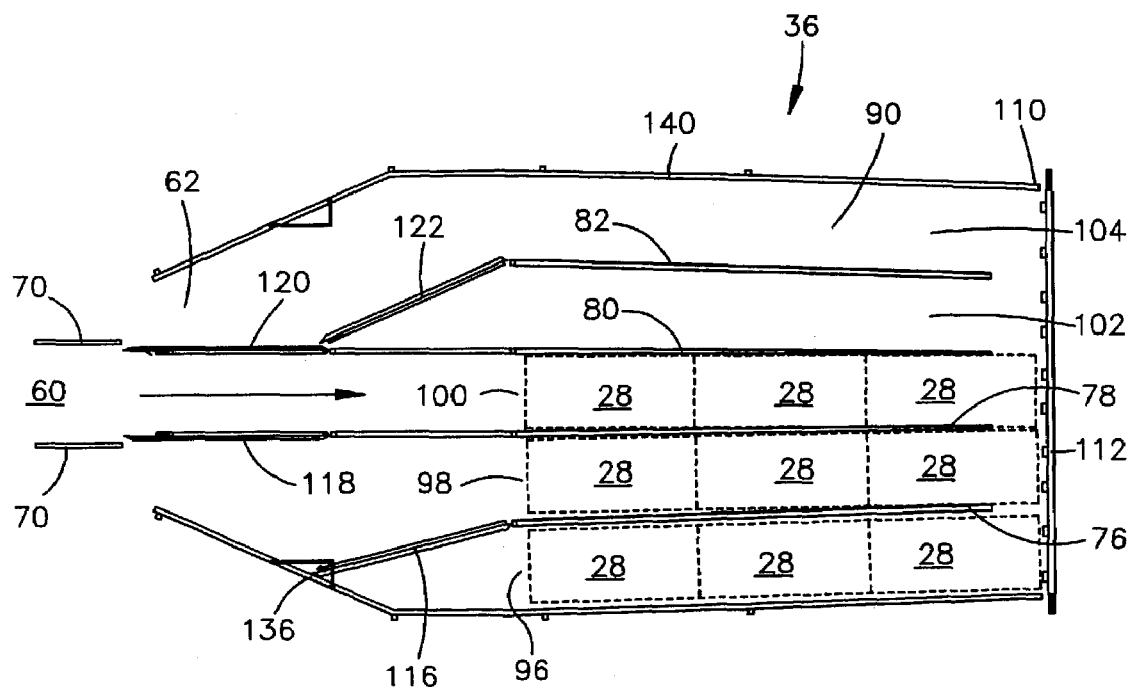
FIG. 7 is a schematic plan view, generally similar to FIGS. 5 and 6, illustrating the manner in which the diverter gates direct bales into a third compartment on the ramp of the bale accumulator.

When the desired number of bales, that is three bales, have been accumulated in the compartment 98, the diverter gate 118 is moved from its initial position illustrated in FIGS. 5 and 6 to its operated position illustrated in FIG. 7. When the diverter gate 118 is in the operated position illustrated in FIG. 7, it cooperates with a diverter gate 120 to direct bales from the chute exit 60 into the center compartment 100. The diverter gate 118 remains in its operated position while bales are directed into the compartment 100 until the compartment is filled with the desired number of bales.

Figure 8:
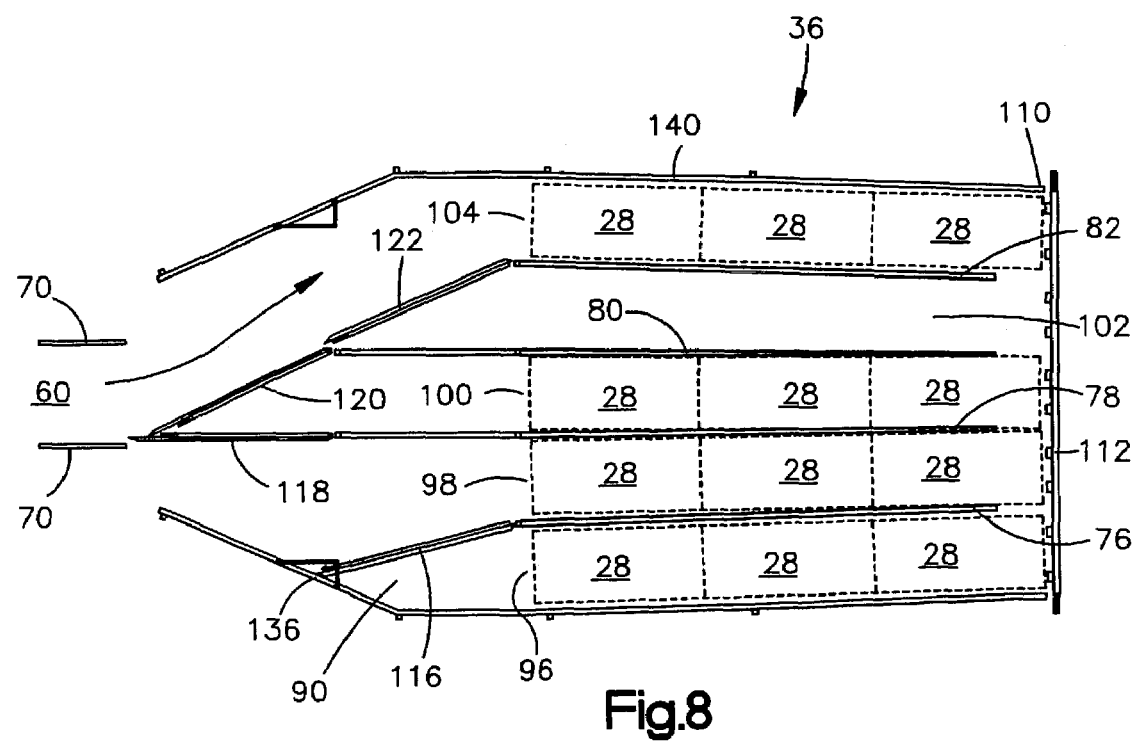
FIG. 8 is a schematic plan view, generally similar to FIGS. 5-7, illustrating the manner in which the diverter gates direct bales into a fourth compartment on the ramp of the bale accumulator.

When the compartment 100 has been filled with the desired number of bales 28, that is, three bales, the diverter gate 120 is moved from its initial position, illustrated in FIGS. 5-7, to its operated position, illustrated in FIG. 8. When the diverter gate 120 has been moved to its operated position, the diverter gate 120 cooperates with the diverter gate 122 and a side rail 140 to direct bales 28 into the compartment 104 (FIG. 8). Bales 28 are directed into the compartment 104 until the desired number of bales have accumulated in the compartment.

Figure 9:
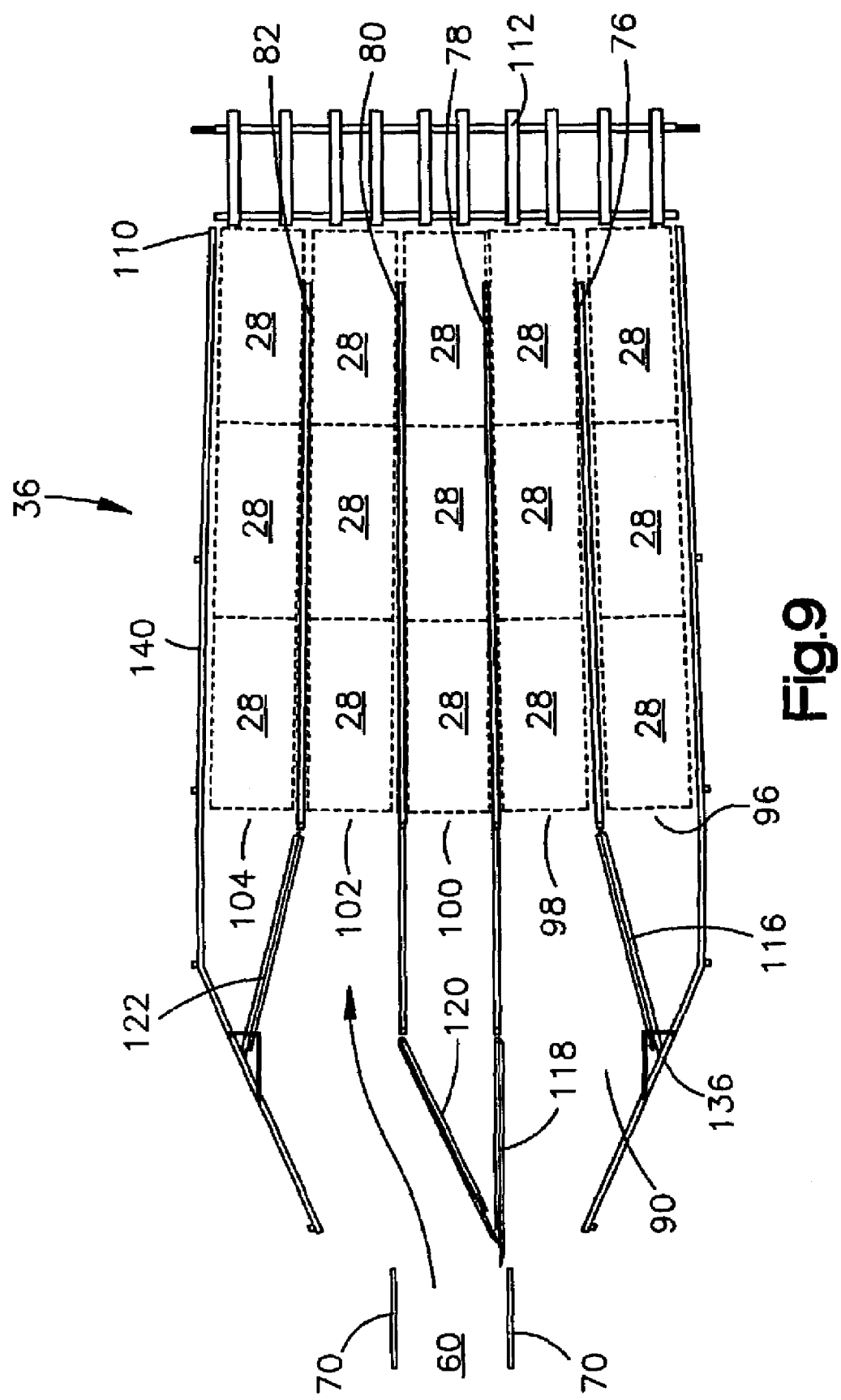
FIG. 9 is a schematic plan view, generally similar to FIGS. 5-8, depicting the manner in which diverter gates direct bales into a fifth compartment on the ramp of the bale accumulator and the manner in which an exit gate is opened to enable bales to slide off of the accumulator ramp assembly onto a field.

When the desired number of bales 28 have been accumulated in the compartment 104, that is, three bales, the diverter gate 122 is moved from its initial position illustrated in FIG. 8 to its operated position illustrated in FIG. 9. When the diverter gate 122 has been moved to its operated position (FIG. 9), bales 28 are directed from the chute exit 60 into the compartment 102 by the diverter gates 120 and 122.

Figure 4:
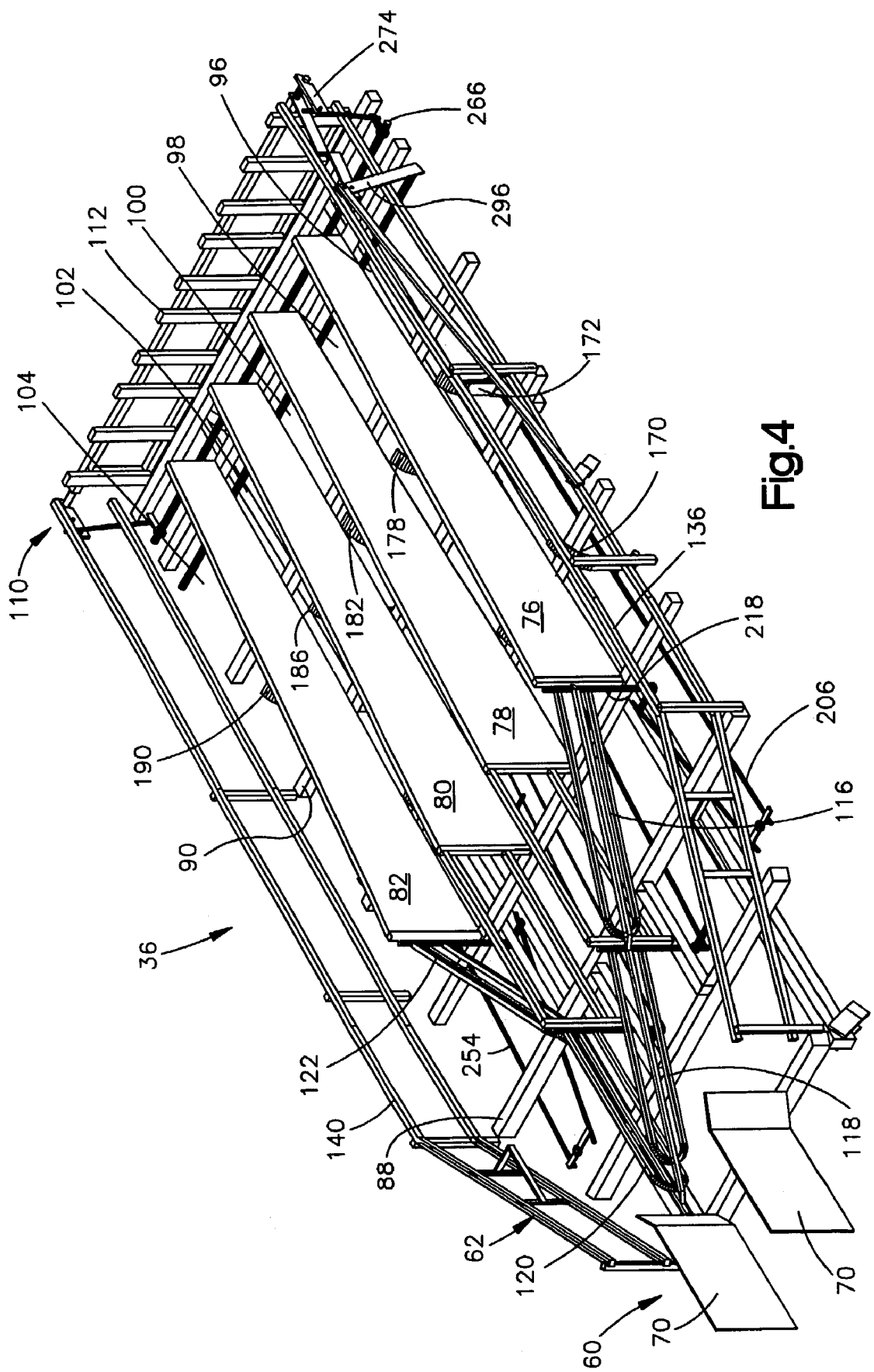
FIG. 4 is a simplified schematic perspective view illustrating diverter gates, guides, and an exit gate which are disposed on a ramp of the bale accumulator of FIGS. 2 and 3.

When the desired number of bales 28, that is, three, have been accumulated in the compartment 102, the exit gate 112 is released for movement from the closed condition illustrated in FIGS. 2 and 4 to the open condition illustrated in FIG. 9. The exit gate 112 is pivoted to the open condition of FIG. 9 under the influence of force applied against the exit gate by the bales on the ramp 90. When the exit gate 112 has been moved to the open condition, the bales in the compartments 96-104 can slide down the ramp 90 to the field 24 (FIG. 1).

As the bales 28 begin to move from the accumulator ramp assembly 36 toward the field 24, they slide along an upper side of the ramp 90 and the upper side of the exit gate 112. The exit gate 112 extends downward from the lower end portion 110 (FIGS. 2 and 3) of the ramp 90 to the field 24. This results in the exit gate 112 forming a continuation of the ramp 90 so that the bales 28 slide smoothly downward onto the field 24 as the baler 26 and bale accumulator 32 move in a forward direction, that is toward the left as viewed in FIG. 1. The resulting smooth sliding movement of the bales 28 from the accumulator ramp assembly 36 onto the field 24 results in the bales being deposited in a group 38 having a desired configuration to facilitate subsequent pick up of the bales.

As the two lower most or leading bales leave each of the compartments 96-104, the diverter gates 116-122 move from their operated positions (FIG. 9) back to their initial positions (FIG. 5). When the diverter gates 116-122 have moved back to their initial positions, the accumulator ramp assembly 36 is ready to receive the next bale 28 from the chute exit 60.

Once the bales 28 have slid down the ramp 90 and across the upper side of the open exit gate 112, the accumulator ramp assembly 36 is empty. The exit gate 112 moves forward, that is toward the left as viewed in FIGS. 1 and 9, away from the bales 28. After the exit gate 112 moves clear of the group 38 of bales in the field 24, the exit gate is moved back to its initial or closed position (FIG. 4). This results in the bale accumulator 32 being returned to its initial condition to receive additional bales 28 and form a next succeeding group of bales 28.

It is believed that it will be preferred to construct the bale accumulator 32 with both the chute 34 and the accumulator ramp assembly 36. However the chute 34 may be used with an accumulator assembly having a construction which is different than the construction of the accumulator ramp assembly 36. Similarly, the accumulator ramp assembly 36 may be used with a chute having a construction which is different than the construction of the chute 34.

Control Assembly

A control assembly 146 (FIG. 10) is effective to sequentially move the diverter gates 116-122 from their initial positions (FIG. 5) to their operated positions (FIG. 9) as the accumulator ramp assembly 36 is filled with bales 28 in the manner previously explained. In addition, the control assembly 146 releases the exit gate 112 for movement from its closed condition (FIG. 4) to its open condition (FIG. 9) when the compartments 96-104 have been filled with bales 28. The control assembly 146 effects movement of the diverter gates 116-122 back to their initial positions and effects closing of the exit gate 112 as the bales 28 move from the accumulator ramp assembly 36 onto the field 24.

The control assembly 146 (FIG. 10) includes an operator assembly 148 for each of the diverter gates 116, 118, 120 and 122 and an operator assembly 150 for the exit gate 112. The operator assemblies 148 sequentially move the diverter gates 116-120 from their initial positions (FIG. 5) to their operated positions (FIGS. 6-9). The operator assembly 150 releases the exit gate 112 for movement from its closed condition to its open condition under the influence of force applied against the exit gate by the weight of the bales on the ramp 90. The diverter gates 116-120 and exit gate 112 are moved back to their initial or closed positions by biasing forces applied by springs and a counterweight. However, the biasing forces could be applied by other devices or by only springs or by only counterweights.

The operator assemblies 148 and 150 include force transmitting assemblies 152 which are connected with the diverter gates 116-122 and exit gate 112. The operator assemblies 148 and 150 include upper and lower actuator members which form upper and lower arrays 153 and 154 of actuator members. The upper and lower arrays 153 and 154 of actuator members are connected with the diverter gates 116-122 and the exit gate 112 by the force transmitting assemblies 152. The upper and lower arrays 153 and 154 of actuator members are disposed in the compartments 96-104.

Each actuator member in the lower array of actuator members 154 is operated by the bales 28 to effect operation of one of the force transmitting assemblies 152 from an inactive condition to an active condition. Once an actuator member in the lower array 154 of actuator members has effected operation of a force transmitting assembly 152 from the inactive condition to the active condition, the force transmitting assembly 152 is effective to transmit force. When the force transmitting assemblies 152 associated with the diverter gates 116-122 are in the active condition, each of these force transmitting assemblies is effective to transmit force from an actuator member in the upper array 153 of actuator members to one of the diverter gates 116-122. When the force transmitting assembly 152 associated with the exit gate 112 is in the active condition, it is effective to transmit force from an actuator member in the upper array 153 of actuator members to a release mechanism 164 for the exit gate 112.

When all of the compartments 96-104 have been filled with bales 28, the exit gate release mechanism 164 is operated to release the exit gate 112 for movement from the closed condition illustrated in FIGS. 4 and 10 to the open condition illustrated in FIG. 9. Once the exit gate 112 has moved to the open condition illustrated in FIG. 9, the exit gate extends downward from the lower end portion 110 of the accumulator ramp assembly 36 to the field 24. The bales 28 then slide down the accumulator ramp assembly 36 under the influence of gravity. The bales slide from the ramp 90 over the upper side surface of the open exit gate 112 onto the field 24. By having the exit gate 112 extend downward from the lower end portion 110 of the ramp 90, dropping of the bales onto the field 24 is avoided.

As the bales 28 are deposited in the group 38 on the field 24, the upper and lower arrays 153 and 154 of actuator members move back to their initial positions illustrated in FIG. 10. When the actuator members in the arrays 153 and 154 are in their initial positions, they are generally perpendicular to an upper side of the ramp 90. At the same time, suitable biasing springs 158 move the diverter gates 116-122 from their operated positions of FIG. 9 back to their initial positions illustrated in FIGS. 5 and 10.

The diverter gate biasing springs 158 (FIG. 10) are helical coil springs which are stressed in torsion. Alternatively, the diverter gate biasing springs 158 may be stressed in tension or compression. The biasing springs 158 may be any desired type of springs or other devices which are effective to move the diverter gates 116-122 to their initial positions.

The upper array 153 of actuator members includes a plurality of actuator members with each of the actuator members disposed in one of the compartments of the plurality of compartments 96-104. Thus, the upper array 153 of actuator members includes an upper actuator member 170 (FIGS. 4 and 10) which is disposed in the compartment 96 at a location midway between the guide member 76 and side rail 136. Similarly, the actuator member 172 in the lower array 154 of actuator members is disposed in the compartment 96. The lower actuator member 172 is also disposed midway between the guide member 76 and the side rail 136.

There are two actuator members in each of the compartments 96-104 in the same relative location as the actuator members 170 and 172. Thus, upper and lower actuator members 176 and 178 are disposed in the compartment 98. Upper and lower actuator members 180 and 182 are disposed in the compartment 100. Upper and lower actuator members 184 and 186 are disposed in the compartment 102. Similarly, upper and lower actuator members 188 and 190 are disposed in the compartment 104. The actuator members 170-190 are all urged toward their upright or initial positions by counterweights 196. It is contemplated that suitable biasing springs may be utilized, rather than the counterweights 196, to urge the actuator members 170-190 to their upright orientations.

When a first bale 28 moves into the compartment 96, the bale slides down the ramp 90 to the exit gate 112. As the first bale moves down the ramp 90, it pivots the upper actuator member 170 from its upright initial position to an operated position in which the upper actuator member 170 extends along the ramp. The upper actuator member 170 pivots about a horizontal axis 198. At this time, a lower side surface of the first bale will be disposed in engagement with elongated members 88 forming the ramp 90 and with the upper side surface of the actuator member 170.

As the first bale continues to move downward along the ramp 90 in the compartment 96, the trailing end of the bale moves past the upper actuator member 170. When this occurs, the counterweight 196 is effective to pivot the upper actuator member 170 about the axis 198. Therefore, the upper actuator member 170 moves from the operated position back to the initial position illustrated in FIG. 10.

As the first bale 28 slides further down the ramp 90, the leading end of the first bale pivots the lower actuator member 172 from its initial position extending upward from the ramp 90 to an operated position in which the lower actuator member 172 extends along the ramp. The lower actuator member 172 is pivoted about a horizontal axis indicated schematically at 200 in FIG. 10.

As the first bale in the compartment 96 continues to slide down the ramp 90, the counterweight 196 is effective to press the lower actuator member 172 against a lower side of the first bale. As the trailing end of the first bale moves downward past the lower actuator member 172, the counterweight 196 causes the lower actuator member 172 to pivot to the initial or upright orientation illustrated in FIG. 10. Continued downward movement of the first bale along the ramp 90 is interrupted when the bale engages the closed exit gate 112.

After the first bale has moved clear of the lower actuator member 172, a next succeeding bale moves into the compartment 96 and engages the upper actuator member 170. As the second bale continues to slide down the ramp 90, the upper actuator member 170 is rotated about its pivot axis 198 from the upright orientation in FIG. 10 to its operated orientation in which it extends along the ramp 90. As the second bale continues to move downward along the accumulator ramp assembly 36, a trailing end of the second bale moves past the upper actuator member 170 and the upper actuator member is returned to its initial upright orientation by the counterweight 196.

As the second bale slides down the ramp 90, a leading end of the second bale engages the lower actuator member 172. Force applied by the leading end of the second bale against the lower actuator member 172 pivots the lower actuator member about the pivot axis 200. This moves the lower actuator member 172 from its upright initial position illustrated in FIG. 10 to an operated position in which the lower actuator member extends along the ramp 90. After the lower actuator member 172 has been pivoted to its operated position, the leading end of the second bale engages the trailing end of the first bale and is stopped by the first bale which is disposed in engagement with the closed exit gate 112. At this time, the lower actuator member 172 is held in its operated position by engagement with the lower side of the second bale.

As the third bale moves into the compartment 96, a leading end of the third bale moves into engagement with the upper actuator member 170. Engagement of the leading end of the third bale with the upper actuator member 170 pivots the upper actuator member from its upright initial position illustrated in FIG. 10 to an operated position in which it extends along the ramp 90. Downward movement of the third bale along the ramp 90 is interrupted by engagement of the leading end of the third bale with the trailing end of the second bale. This results in the upper actuator member 170 being held in its operated position by engagement with the lower side surface of the third bale.

As the third bale moves into the compartment 96, the lower actuator member 172 is in its operated position. This enables the control assembly 146 to respond to movement of the upper actuator member 170 to pivot the diverter gate 116. The diverter gate 116 is pivoted from its initial position illustrated in FIG. 5 to its operated position illustrated in FIG. 6 by force transmitted from the upper actuator member 170 through the operator assembly 148 to the diverter gate 116. This force is effective to pivot the diverter gate 116 against the influence of the biasing spring 158 which urges the diverter gate toward its initial position.

The force for moving the diverter gate 116 is transmitted from the upper actuator member 170 to the diverter gate 116 through a rigid metal main actuator member or rod 206. The main actuator member 206 is pivotally connected with an intermediate member or lever 210. The intermediate lever 210 is pivotal about an axis extending through a center of the intermediate lever. Pivotal movement of the intermediate lever 210 about its upright central axis results in force being transmitted through a secondary operator member 212 to a lever 216 connected with a support post 218 for the diverter gate 116.

Force transmitted from the lever 216 to the support post 218 is effective to pivot the diverter gate 116 in a counterclockwise direction (as viewed in FIG. 5) about its support post 218 (FIG. 10). This moves the diverter gate 116 from the initial position illustrated in FIGS. 5 and 10 to the operated position illustrated in FIG. 6. The diverter gate 116 pivots to the operated position against the influence of the biasing spring 158 connected with the support post 218. If desired, the diverter gate biasing spring 158 may be connected with the lever 216 or other component of the force transmitting assembly 152 connected with the diverter gate 116.

To enable force to be transmitted from the upper actuator member 170 to the main operator member or rod 206, a hook or projection 222 (FIG. 11) is disposed on the main operator member 206 at a location adjacent to the upper actuator member 170. When pivotal movement of the actuator member 170 begins as the third or last bale 28 moves into the compartment 96, a pin 226 moves into engagement with the projection 222. Continued rotation of the upper actuator member 170 about its pivot axis 198 results in force being transmitted from the upper actuator member through the pin 226 to the projection 222.

The force transmitted to the projection 222 from the upper actuator member 170 is effective to move the main operator member or rod 206 in an axial direction toward the exit gate 112. As this occurs, force is transmitted through the main operator member 206 to the intermediate member 210. This force pivots the intermediate member 210 in a counterclockwise direction (as viewed in FIG. 10) about its central axis. This results in the secondary operator member or rod 212 being pulled toward the left (as viewed in FIG. 10) by the intermediate member 210. Leftward (as viewed in FIG. 10) movement of the second operator member 212 is effective to pivot the lever 216 and the diverter gate support post 218 to move the diverter gate 116 from its initial position (FIG. 5) to its operated position (FIG. 6).

The first two bales which are directed into the compartment 96 are effective to pivot the upper actuator member 170 from its initial position to an operated position in which it extends along the ramp 90. However, this pivotal movement of the upper actuator member 170 is not transmitted to the main operator member or rod 206. Therefore, the diverter gate 116 remains in its initial position as the first two bales 28 enter the compartment 96.

To prevent force from being transmitted from the upper actuator member 170 to the main operator member 206 during movement of the first two bales along the upper actuator member 170, the main operator member is supported in a spaced apart relationship with the pin 226 which extends from the upper actuator member 170. The right (as viewed in FIG. 10) end portion of the main operator member 206 is disposed in a loop formed in a cable 232 connected with an upper end portion of the lower actuator member 172.

When the lower actuator member 172 is in its initial position illustrated in FIG. 10, the cable 232 supports the right (as viewed in FIG. 10) end portion of the main operator member 206 with the projection 222 above the pin 226 extending from the upper actuator member 170. Therefore, the pin 226 can not transmit force to the main actuator member 206 at this time. The pin 226 connected with the upper actuator member 170 can engage the projection 222 (FIG. 11) on the main operator member 206 only when the lower actuator member 172 is pivoted to its operated position by engagement with one of the bales 28.

When the lower actuator member 172 is moved to its operated position by the second bale to enter the compartment 96, the lower actuator lever 172 is pivoted in a clockwise direction (as viewed in FIG. 10) about the axis 200 against the influence of the counterweight 196. This results in a lowering of the cable 232 and the right (as viewed in FIG. 10) end portion of the main operator member 206 by the lower actuator member 172. As this occurs, the main operator member 206 moves downward into engagement with the pin 226 extending from the upper actuator member 170. The lower actuator member 172 is maintained in its operated position by engagement with the lower side of the second bale 28.

When a next succeeding bale 28, that is the third bale, is moved into the compartment 96, the third bale is effective to pivot the upper actuator member 170 in a clockwise direction (as viewed in FIG. 10) about its pivot axis 198. This moves the pin 226 toward the right (as viewed in FIG. 10). This rightward movement of the pin 226 applies a force against the projection 222 (FIG. 11) on the main operator member 206. The main operator member 206 moves axially toward the right (as viewed in FIG. 10) to pivot the intermediate member 210 about its central axis.

The upper and lower actuator members 176 and 178 are disposed in the compartment 98. The actuator members 176 and 178 and associated force transmitting assembly 152 cooperate to pivot the diverter gate 118 from its initial position (FIG. 6) to its operated position (FIG. 7) when the compartment 98 is filled with bales 28. Force is transmitted from the upper actuator member 176 through a main operator member or rod 240 in the same manner as previously explained in conjunction with the main operator member 206 and the upper and lower actuator members 170 and 172. Although only the projection 222 for the main operator member 206 is illustrated in FIG. 11, it should be understood that a similar projection extends from the main operator member 240 and is engageable by a pin 244 connected with the upper actuator member 176.

The diverter gate 120 is pivoted from its initial position (FIG. 7) to its operated position (FIG. 8) by force transmitted from the upper actuator member 180 through a main operator member or rod 248 when the compartment 100 is filled with bales 28. The main operator member or rod 248 cooperates with the upper and lower actuator members 180 and 182 in the same manner as in which the main operator member 206 cooperates with the upper and lower actuator members 170 and 172. Although only the projection 222 for the main operator member 206 is illustrated in FIG. 11, it should be understood that a similar projection extends from the main operator member 248 and is engageable by a pin connected with the upper actuator member 180.

The diverter gate 122 is pivoted from its initial position (FIG. 8) to its operated position (FIG. 9) when the compartment 104 is filled with bales 28. The diverter gate 122 is pivoted to its operated position under the influence of force transmitted from an upper actuator member 188 through a main operator member or rod 254 (FIG. 10) in the same manner as previously explained with the upper and lower actuator members 170 and 172 and main operator member or rod 206.

When all of the compartments 96-104 have been filled with bales 28, in the manner illustrated schematically in FIG. 9, the exit gate 112 is operated from the closed condition (FIG. 10) to the open condition (FIG. 9). To enable the exit gate 112 to be operated to its open condition, the upper and lower actuator members 184 and 186 disposed in the last compartment to be filled, that is, the compartment 102 (FIG. 9), are connected with the exit gate release mechanism 164 (FIG. 10) by the operator assembly 150.

The operator assembly 150 includes an elongated rigid metal main operator member or rod 262 which is associated with the actuator members 184 and 186. The right (as viewed in FIG. 10) end of the main operator member 262 is connected with a rock shaft 266 by a lever 268. The rock shaft 266 extends along the lower end portion 110 of the ramp 90 at a level below the path of movement of the bales 28. The rock shaft 266 is connected with the main operator member or rod 262 by the lever 268.

The rock shaft 266 is connected with a gate release hook 274 by a rod 276. The gate release hook 274 is pivotal in a counterclockwise direction about a pivot axis disposed midway between the rod 276 and an end of the gate release hook which engages the exit gate 112. Pivotal movement of the gate release hook 274 disengages it from the exit gate 112. This releases the exit gate for movement from the closed condition of FIG. 10 to the open condition of FIG. 9. The exit gate 112 moves to the open condition (FIG. 9) under the influence of force applied against the exit gate by the bales 28 on the downwardly sloping ramp 90.

When the exit gate 112 moves to the open condition, it pivots in a clockwise direction (as viewed in FIG. 10) about a pivot axis 282. As the exit gate 112 pivots to the open condition, a biasing assembly 286 is actuated. The biasing assembly 286 is effective to urge the exit gate 112 toward the closed condition. However, the weight of the bales 28 moving from the ramp 90 across the exit gate 112 is effective to hold the exit gate in its open condition.

The tractor (not shown) pulling the baler 26 (FIG. 1) pulls the bale accumulator 32 and its open exit gate 112 toward the left (as viewed in FIGS. 1 and 10). This movement of the bale accumulator 32 moves the exit gate 112 from beneath the group 38 of bales 28. Therefore, the gate 112 is separated from the group 38 of bales as it is deposited on the field 24. When this occurs, the biasing assembly 286 pivots the exit gate 112 in a counterclockwise direction (as viewed in FIG. 10) about the axis 282 to return the gate to its closed condition. As this happens, the gate release hook 272 snaps back down onto the exit gate 112 to hold it in its closed position.

The biasing assembly 286 is of the counterweight type and includes a relatively large counterweight 290. The counterweight 290 is connected with the exit gate by a linkage 292. It should be understood that a spring may be used to provide the force to move the exit gate 112 from its open condition to its closed condition.

When the exit gate 112 pivots to its open condition, a main link 296 is pivoted in a clockwise direction (as viewed in FIG. 10). This results in the counterweight 290 being pivoted in a clockwise direction (as viewed in FIG. 10) by the linkage 292. As the counterweight 290 is pivoted in a clockwise direction, it is raised from its initial or closed gate condition illustrated in FIG. 10.

When the exit gate 112 is disengaged from the group 38 of bales 28, the counterweight 290 applies force to the linkage 292 to pivot the main link 296 in a counterclockwise direction. This results in the exit gate 112 being pivoted to the closed condition under the influence of force transmitted from the counterweight 290 through the linkage 292. When the exit gate 112 reaches the closed condition (FIG. 10) the counterweight 290 will have moved to its initial position. If desired, a suitable biasing spring may be substituted for the counterweight 290.

It is contemplated that the control assembly 146 may have a construction which is different than the illustrated construction. For example, the upper and lower arrays 153 and 154 of actuator members may have a different orientation relative to the compartments. Rather than extending upward from the ramp 90 into the compartments 96-104, the actuator members may extend downward into the compartments from supports disposed above the ramp. Rather than using a plurality of arrays 153 and 154 of actuator members, a single array of actuator members may be used. If this is done, index devices may be associated with the actuator members to effect pivotal movement of each of the diverter gates 116-122 after a desired member of bales have entered the associated compartments 96-104.

Second Embodiment

In the embodiment of the invention illustrated in FIGS. 1-11, the operator assembly 148 includes rigid metal rods 206, 240, 248, 254, and 262 which are utilized to transmit force from the upper actuator members 170, 176, 180, 184 and 188 to the diverter gates 116-122. In the embodiment of the invention illustrated in FIG. 12, flexible force transmitting members are utilized to transmit force from the actuator members to the diverter gates. Nomenclature similar to the nomenclature utilized in association with the embodiment of the invention illustrated in FIGS. 1-11 will be utilized in association with corresponding components of the embodiment of the invention illustrated in FIG. 12.

A diverter gate 320 is disposed on a support post 322 which is pivotal about its central axis. The diverter gate 320 is pivotal between an initial position and an operated position to direct bales into compartments on an accumulator ramp assembly in the manner previously explained in connection with the embodiment of the invention illustrated in FIGS. 1-11. Although only a single diverter gate 320 has been illustrated in FIG. 12, it should be understood that the diverter gate 320 is representative of a plurality of diverter gates disposed in a bale accumulator having the same construction as the bale accumulator 32 of FIGS. 1-11.

An operator assembly 326 is provided to operate the diverter gate 320 between initial and operated conditions. The operator assembly 326 includes an upper actuator member 330 and a lower actuator member 332. The upper and lower actuator members 330 and 332 are disposed in a compartment corresponding to one of the compartments 96-104 of the embodiment of the invention illustrated in FIGS. 1-11. The upper actuator member is pivotal about an axis 336. The lower actuator member 332 is pivotal about an axis 338. Counterweights 340 urge the actuator members to their initial positions.

The upper actuator member 330 is connected with one end of an intermediate lever 344 by flexible cable 346. Similarly, the lower actuator member 332 is connected with the opposite end of the intermediate lever 344 by a flexible cable 348. The intermediate lever 344 is pivotally connected to a lever 352. The lever 352 is connected with a support post 322. The intermediate lever 344 is pivotal relative to the lever 352.

Figure 12:
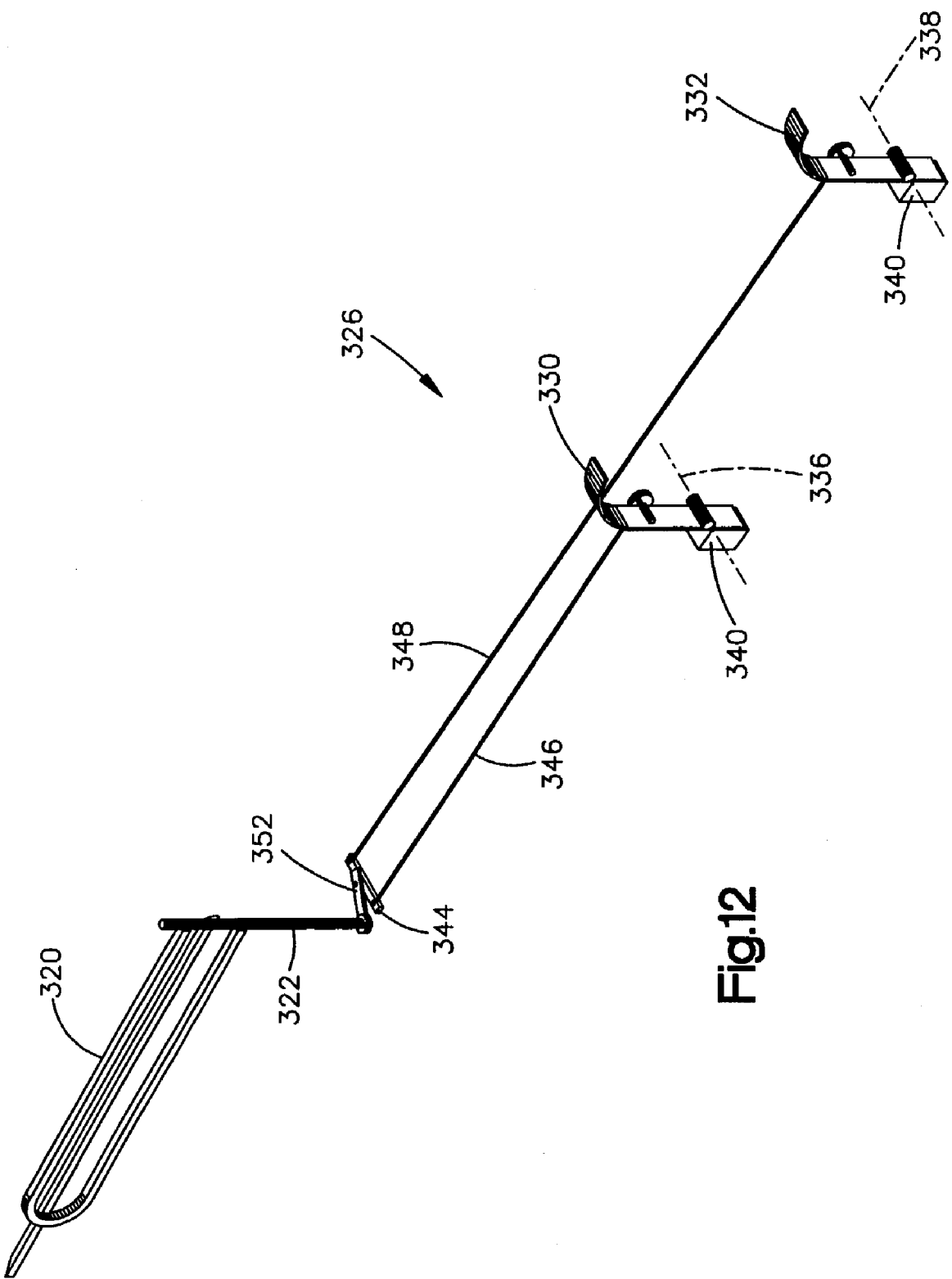
FIG. 12 is a simplified schematic illustration depicting the relationship of a second embodiment of an operator assembly for a diverter gate.

When the upper and lower actuator members 330 and 332 are in their initial position illustrated in FIG. 12, there is slack in the cables 348. This slack is sufficient to enable either one of the upper and lower actuator members 330 and 332 to be pivoted by engagement with a bale without effecting movement of the diverter gate 320. However, when the lower actuator member 332 is pivoted to its actuated position extending along a ramp of a bale accumulator, the cable 348 is tensioned. This tension pivots the intermediate lever 344 about a location disposed between opposite ends of the lever. Pivoting of the intermediate lever 344 is effective to tension the cable 346. At this time, the cables 346 and 348 are not tensioned with sufficient force to cause movement of the diverter gate 320 against the influence of a biasing spring connected with a support post 322.

When the upper actuator member 330 is pivoted to its actuated position while the lower actuator member is already in its actuated position, the slack in the cables 346 and 348 has been taken up. Therefore, pivotal movement of the upper actuator member 330 by a bale tensions the cable 346 with sufficient force to pivot the lever 352 and the upper diverter gate 320 against the influence of a biasing spring for the upper diverter gate.

Although only a single diverter gate 320 and operator assembly 326 has been illustrated in FIG. 12, it should be understood that the diverter gate 320 is representative of a plurality of diverter gates and the operator assembly 326 is representative of a plurality of operator assemblies. The bale accumulator 32 may be constructed using a plurality of operator assemblies having the same construction as the operator assembly 326, in place of the operator assemblies 148 and 150 of FIG. 10.

CONCLUSION

In view of the foregoing description, it is apparent that the present invention provides a new and improved apparatus 32 to deposit bales in groups 38 in a field 24. This apparatus 32 may include a chute 34 having a lower end portion 48 through which bales 28 move into the chute and an upper end portion 56 through which bales leave the chute. The bales 28 may move from the chute 34 onto a ramp 90 having an upper side which slopes downward in a direction away from the chute.

A plurality of guides 76-82 may be provided adjacent to the upper side of the ramp 90 to form compartments 96-104 in which bales 28 are accumulated. Diverter gates 116-122 may be provided at the upper end portion of the ramp 90 to direct the bales into each of the compartments 96-104 in turn. An exit gate 112 is disposed adjacent to the lower end portion of the ramp 90.

The exit gate 112 is operable between a closed condition blocking movement of bales 28 from the compartments 106-104 and an open condition in which bales accumulated in the compartments can move off of the ramp 90 onto the field 24. When the exit gate 112 is in the open condition, the exit gate may form an extension of the ramp 90 to enable bales 28 to move along an upper side of the exit gate onto the field 24.

When the bales 28 are deposited in the field 24, they are advantageously deposited with cut stems of the crop stock in an upright orientation to facilitate drying of the crop stock. To enable the bales 28 to be positioned on the field 24 with the cut stems in an upright orientation, the chute 34 may be effective to rotate the bales through a quarter turn.

The present invention relates to a bale accumulator 32 having a plurality of different features. These features may be utilized in combination with each other in the manner disclosed in herein. Alternatively, the features may be used separately and/or in combination with features of known devices.

Having described the invention, the following is claimed:

1. An apparatus for use in depositing bales in groups in a field, said apparatus comprising an upwardly extending chute having a lower end portion with an entrance through which bales move into said chute as the apparatus moves around the field and an upper end portion with an exit through which bales leave said chute, an inclined ramp connected with said chute and having an upper side which slopes downward away from the exit from said chute and forms a continuation of the exit from said chute to enable a leading end portion of a bale to engage said upper side of said inclined ramp while a trailing end portion of the bale is in engagement with the exit from said chute so that the bale can slide along both the exit from said chute and the upper side of said inclined ramp, a plurality of guides which are connected with said ramp and cooperate with said upper side of said inclined ramp to form a plurality compartments in which bales are accumulated, a plurality of diverter gates which are disposed adjacent to an upper end portion of said inclined ramp and are operable to direct bales to the compartments as the bales slide downward on the upper side of said inclined ramp, and an exit gate which is disposed adjacent to a lower end portion of said inclined ramp, said exit gate being operable between a closed condition blocking sliding movement of bales from said compartments on the upper side of said inclined ramp and an open condition in which a group of bales accumulated in said compartments slide under the force of gravity downward from said compartments on the upper side of said inclined ramp and onto the field in the same relative positions that the group of bales were in when in said compartments, said inclined ramp being configured to position said bales accumulated in the compartments of the inclined ramp out of contact with the field until said exit gate operates to said open condition.

2. An apparatus as set forth in claim 1 further including a plurality of gate operator assemblies each of which is connected with one of said diverter gates of said plurality of diverter gates, each of said gate operator assemblies includes a plurality of spaced apart actuator members, each of said actuator members of said plurality of actuator members for any one of said gate operator assemblies being disposed in one of said compartments of said plurality compartments, and a force transmitting assembly which extends between said actuator members for any one of said gate operator assemblies and one of said diverter gates of said plurality of diverter gates.

3. An apparatus as set forth in claim 2 wherein each of said actuator members for any one of said gate operator assemblies is movable from an initial position to an actuated position to effect movement of said one of said diverter gates relative to the upper side of said inclined ramp.

4. An apparatus as set forth in claim 1 wherein said exit gate extends upward from the upper side of said inclined ramp when said exit gate is in the closed condition, said exit gate extends downward from the upper side of said inclined ramp to enable bales to move from the compartments along an upwardly facing side of said exit gate onto the field when said exit gate is in the open condition.

5. An apparatus as set forth in claim 1 wherein said chute includes a plurality of surfaces which engage each bale and rotate each bale about an axis which extends along a longitudinal axis of said chute as each bale moves from the lower end portion of said chute to the upper end portion of said chute.

6. An apparatus as set forth in claim 1 further including a plurality of actuator members each of which is connected with one of said diverter gates of said plurality of diverter gates, each of said actuator members of said plurality of actuator members being movable between an initial position extending upward from the upper side of said inclined ramp and an actuated position extending along the upper side of said inclined ramp, each of said actuator members being maintained in the actuated position by engagement with a lower side of a bale.

7. An apparatus as set forth in claim 1 further including an actuator member connected with said exit gate, said actuator member being movable from an initial position extending upward from the upper side of said inclined ramp to an actuated position extending along the upper side of said inclined ramp by one of said bales as said one bale moves into one of said compartments to effect operation of said exit gate from the closed condition to the open condition.

8. An apparatus as set forth in claim 1 wherein said exit gate slopes downward from the lower end portion of said inclined ramp toward the field when said exit gate is in the open condition to enable the group of bales to move along one side of said exit gate toward the field.

9. An apparatus as set forth in claim 1 wherein each of said diverter gates of said plurality of diverter gates is movable between a first position and a second position, a control apparatus is connected with each of said diverter gates of said plurality of diverter gates, said control apparatus being operable to maintain first and second diverter gates of said plurality of diverter gates in their first positions during movement of a plurality of bales into a first compartment of said plurality of compartments, said control apparatus being operable to effect movement of said first diverter gate from its first position to its second position in response to movement of a predetermined number of bales into said first compartment, said first diverter gate being effective to block movement of bales into said first compartment when said first diverter gate is in its second position, said control apparatus being operable to maintain said first diverter gate in its second position and to maintain said second diverter gate in its first position during movement of a plurality of bales into a second compartment, said control apparatus being operable to effect movement of said second diverter gate from its first position to its second position in response to movement of a predetermined number of bales into said second compartment, said second diverter gate being effective to block movement of bales into said second compartment when said second diverter gate is in the second position, said control apparatus being operable to maintain said second diverter gate in its second position during movement of a plurality of bales into a third compartment of said plurality of compartments.

10. An apparatus as set forth in claim 9 wherein said control apparatus is operable to effect movement of said exit gate from its closed condition to its open condition in response to movement of a predetermined number of bales into said third compartment.

11. An apparatus as set forth in claim 10 further including first biasing means for moving said exit gate from its open condition to its closed condition, second biasing means for moving said first diverter gate from its second position to its first position, and third biasing means for moving said second diverter gate from its second position to its first position upon movement of the bales onto the field.

12. An apparatus as set forth in claim 11 wherein said first biasing means includes a counterweight.

13. An apparatus as set forth in claim 1 further including biasing assembly which is connected with said exit gate and urges said exit gate toward the closed condition, an actuator member which is disposed in one of said compartments of said plurality of compartments, and a force transmitting assembly which is effective to transmit force from said actuator member to effect movement of said exit gate from the closed condition to the open condition in response to accumulation of a predetermined number of bales on said inclined ramp.

14. An apparatus as set forth in claim 1 wherein first and second actuators are disposed in one of said compartments of said plurality of compartments, a force transmitting assembly is connected with at least one of said gates, said force transmitting assembly being operable between a first condition and a second condition by said first actuator, said force transmitting assembly being operable by said second actuator to transmit force to effect movement of one of said gates relative to said inclined ramp when said force transmitting assembly is in the second condition.

15. An apparatus as set forth in claim 14 wherein said one of said gates is one of said diverter gates, said force transmitting assembly being effective to move said one of said diverter gates between a first position in which said one of said diverter gates is ineffective to block movement of a bale into said one of said compartments and a second position in which said one of said diverter gates is effective to block movement of a bale into said one of said compartments under the influence of force transmitted to said force transmitting assembly from said second actuator when said force transmitting assembly is in the second condition.

16. An apparatus as set forth in claim 14 wherein said one of said gates is said exit gate, said force transmitting assembly being operable to effect movement of said exit gate from the closed condition to the open condition upon transmission of force from said second actuator when said force transmitting assembly is in the second condition.

17. An apparatus as set forth in claim 1 further including means for accelerating one bale relative to a next succeeding bale to provide space between the one bale and the next succeeding bale as the one bale slides downward along the upper side of said inclined ramp.

18. An apparatus as set forth in claim 1 wherein each of said guides of said plurality of guides includes a panel which extends transverse to upper side of said inclined ramp and which at least partially defines one of said compartments of said plurality of compartments.

19. An apparatus as set forth in claim 1 further including a plurality of actuator members disposed in each of said compartments and a plurality of operating assemblies, each of said operating assemblies connects at least one of said actuator members in one of said compartments with one of said gates, each of said operating assemblies being operable to effect movement of one of said gates from a first position to a second position in response to movement of first and second actuators in one of said compartments from their initial positions to their actuated positions under the influence of force applied to said first and second actuators by a plurality of bales.

20. An apparatus for use in depositing bales in groups in a field, said apparatus comprising a chute along which the bales move from a lower end portion of said chute to an upper end portion of said chute, said chute includes a plurality of surfaces which engage and rotate each bale about an axis which extends along a longitudinal axis of said chute as each bale moves from the lower end portion of said chute to an upper end portion of said chute, and an accumulator which receives bales from the upper end portion of said chute, said accumulator having an outlet through which the bales move to form a group of bales in the field.

21. An apparatus as set forth in claim 20 wherein said accumulator includes a ramp having an upper side which slopes downward away from the upper end portion of said chute, a plurality of guides which are connected with said ramp and cooperate with said upper side of said ramp to form a plurality of compartments in which bales are accumulated, and a plurality of diverter gates are disposed adjacent to an upper end portion of said ramp and are operable to divert bales to each of the compartments as the bales slide downward along the upper side of said ramp.

22. An apparatus as set forth in claim 20 wherein said chute includes a plurality of elongated members which are spaced apart from each other and extend between the lower and upper end portions of said chute, each surface of said plurality of surfaces being disposed on one of said elongated members.

23. An apparatus as set forth in claim 22 wherein an upper end portion of each one of the elongated members of said plurality of elongated members is offset by ninety degrees from a lower end portion of the one elongated member.

24. An apparatus as set forth in claim 20 further including a plurality of rollers disposed adjacent to the upper end portion of said chute to accelerate one bale relative to a next succeeding bale to provide space between the one bale and the next succeeding bale.

25. An apparatus for use in depositing bales in groups in a field, said apparatus comprising an inclined ramp having an upper side which slopes downward away from an upper end portion of said inclined ramp, a plurality of guides which are connected with said ramp and cooperate with said upper side of said inclined ramp to form a plurality compartments on said upper side of inclined ramp and in which bales are accumulated, a plurality of diverter gates which are disposed adjacent to the upper end portion of said inclined ramp and are operable to direct bales to each of the compartments as the bales slide downward along the upper side of said inclined ramp, and an exit gate which is disposed adjacent to a lower end portion of said inclined ramp, said exit gate being operable between a closed condition blocking movement of bales from said compartments to enable bales to accumulate in said compartments on said upper side of said inclined ramp and an open condition in which said exit gate slopes downward from the lower end portion of said inclined ramp toward the field to enable a group of bales accumulated in said compartments on said upper side of said inclined ramp to slide downward from said compartments on the upper side of said inclined ramp and on an upper side of said exit gate onto the field in the same relative positions the group of bales were in when in said compartments, said inclined ramp being configured to position said bales accumulated in the compartments of the inclined ramp out of contact with the field until said exit gate operates to said open condition.

26. An apparatus as set forth in claim 25 further including a chute having a lower end portion through which bales enter said chute and an upper end portion connected with said upper end portion of said ramp and through which bales leave said chute, said chute includes a plurality of surfaces which engage and rotate each bale about an axis which extends along a longitudinal axis of said chute as each bale moves from the lower end portion of said chute to the upper end portion of said chute.

27. An apparatus as set forth in claim 25 further including a biasing assembly which is connected with said exit gate and urges said exit gate toward the closed condition, and an operator assembly which is connected with said exit gate and is operable to effect movement of said exit gate from the closed condition to the open condition against the influence of said biasing assembly, said operator assembly includes an actuator member which is disposed in one of said compartments of said plurality of compartments and a force transmitting assembly connected with said actuator, said operator assembly being operable to effect movement said exit gate from the closed condition to the open condition.

28. An apparatus as set forth in claim 27 wherein said actuator member is movable from an initial position extending outward from the upper side of said inclined ramp to an actuated position extending along the upper side of said inclined ramp to effect operation of said operator assembly and movement of said exit gate from the closed condition to the open condition.

29. An apparatus as set forth in claim 25 further including a plurality of actuator members each of which is connected with one said diverter gates of said plurality of diverter gates, each of actuator member of said plurality of actuator members being movable from a first position extending outward from the upper side of said inclined ramp to an actuated position extending along the upper side of said inclined ramp.

30. An apparatus as set forth in claim 25 wherein first and second actuators are disposed in one of said compartments of said plurality of compartments, a force transmitting assembly is connected with at least one of said gates, said force transmitting assembly being operable between a first condition and a second condition by said first actuator, said force transmitting assembly being operable by said second actuator to transmit force to said one of said gates to move said one of said gates relative to said inclined ramp when said force transmitting assembly is in the second condition.

31. An apparatus as set forth in claim 30 wherein said one of said gates is one of said diverter gates, said force transmitting assembly being effective to move said one of said diverter gates between a first position in which said one of said diverter gates is ineffective to block movement of a bale into said one of said compartments and a second position in which said one of said diverter gates is effective to block movement of a bale into said one of said compartments under the influence of force transmitted to said force transmitting assembly from said second actuator when said force transmitting assembly is in the second condition.

32. An apparatus as set forth in claim 30 wherein said one of said gates is said exit gate, said force transmitting assembly being operable to effect movement of said exit gate from the closed condition to the open condition and to transmit force from said second actuator when said force transmitting assembly is in the second condition.

33. An apparatus for use in depositing bales in groups in a field, said apparatus receiving bales from an upwardly extending chute having a lower end portion with an entrance through which bales move into said chute as the apparatus moves around the field and an upper end portion with an exit through which bales leave said chute, said apparatus comprising an inclined ramp which receives bales from said chute said inclined ramp having an upper side which slopes downward away from the exit from said chute and enables a leading end portion of a bale to be received on said upper side of said inclined ramp, a plurality of guides which are connected with said inclined ramp and cooperate with said upper side of said inclined ramp to form a plurality compartments which are disposed along said upper side of said inclined ramp and in which bales are accumulated, a plurality of diverter gates which are disposed adjacent to an upper end portion of said inclined ramp and are operable to direct bales to the compartments as the bales slide downward on the upper side of said inclined ramp, and an exit gate which is disposed adjacent to a lower end portion of said inclined ramp, said exit gate being operable between a closed condition blocking movement of bales from said compartments on the upper side of said inclined ramp and an open condition in which a group of bales accumulated in said compartments slide downward from said compartments on the upper side of said inclined ramp and onto the field, said inclined ramp being configured to position said bales accumulated in the compartments of the inclined ramp out of contact with the field until said exit gate operates to said open condition.

34. An apparatus as set forth in claim 1 wherein said inclined ramp and said exit gate are configured to cause said group of bales to deposit onto the field in a desired configuration to facilitate subsequent pick up of the bales.

35. An apparatus as set forth in claim 1 wherein each of said bales accumulated in said ramp is in contact with said ramp when said exit gate operates in said closed condition.

* * * * *